UNITED STATES PATENT OFFICE.

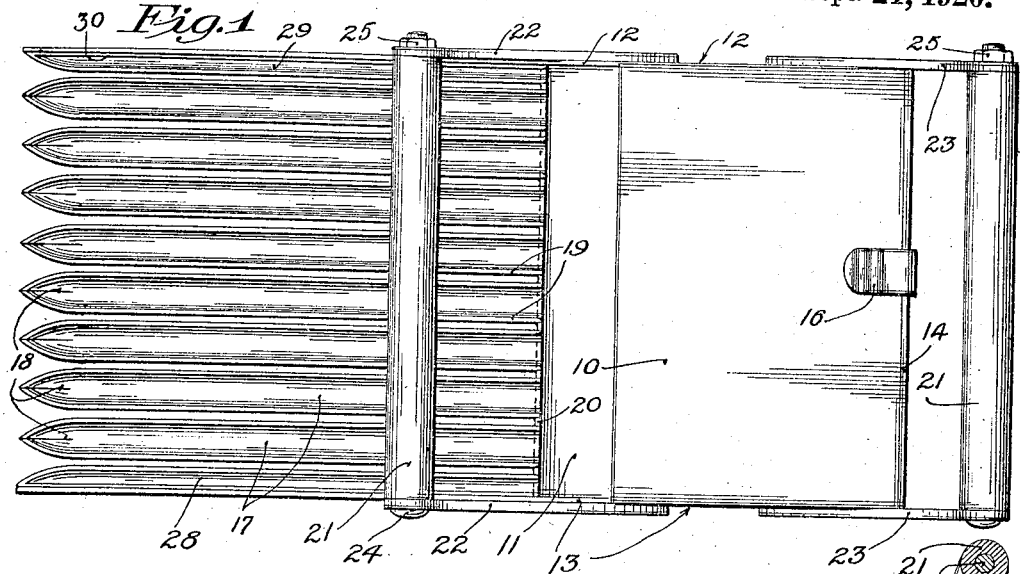

ANTHONY MAHTES, OF DEXTERVILLE, WISCONSIN, ASSIGNOR OF ONE-THIRD TO JACOB MASKOLIUNAS AND ONE-THIRD TO J. SKINDER, BOTH OF CHICAGO, ILLINOIS.

BERRY-PICKER.

1,353,172.  Specification of Letters Patent.  Patented Sept. 21, 1920.

Application filed March 13, 1920. Serial No. 365,488.

*To all whom it may concern:*

Be it known that I, ANTHONY MAHTES, a citizen of the United States, and a resident of Dexterville, in the county of Wood and State of Wisconsin, have invented certain new and useful Improvements in Berry-Pickers, of which the following is a specification.

My invention relates to berry picking devices and particularly to a novel improvement in such devices adapted for use in removing blueberries from the bushes on which they grow.

One of the objects of my invention is to provide a simple device which may be cheaply constructed, light in weight and which will be efficient in picking berries. Blueberries, or whortleberries as they are sometimes called, grow on relatively low bushes and the labor of hand picking is great. I have, therefore, provided mechanism which may readily be handled and which includes a box, from an open side of which project fingers in the form of troughs, the outer ends of which are pointed and closed. The floor of the box is preferably depressed below the level of the troughs in order to retain the berries and prevent their flowing into the troughs as the picker is swung forward. Preferably, the rear wall of the box is in the form of a hinged closure adapted to be swung outwardly to discharge the berries which have been collected in the box. Other details of construction will be described hereinafter.

The invention will be more readily understood by reference to the accompanying drawing wherein:

Figure 1 is a plan view of a picker constructed in accordance with my invention;

Fig. 2 is a longitudinal sectional view therethrough; and,

Fig. 3 is a fragmentary, transverse sectional view showing the construction of the troughs and a form of connection between the troughs and the sides of the device.

In the drawings it will be seen that I provide a box having top and bottom walls 10, 11, side walls 12, 13, and an end wall 14, the latter being hinged at 15 and held in closed position by means of a spring latch 16. The side walls are projected outwardly beyond the box and form side guards for the picking-fingers or troughs 17. These troughs are each composed of a strip of metal bent to form a semicircular chute, the outer ends being bent upwardly, as at 18, and inwardly to form a relatively sharp point. The end portion is slightly upturned as best shown in Fig. 2. The troughs are spaced apart a distance somewhat less than the diameter of the berries to be picked and the marginal edges 19 are suitably rounded to eliminate sharp edges and prevent the cutting off of leaves and twigs which would not otherwise be removed. The rear ends of the troughs are suitably secured as by soldering or welding to an upstanding web 20, having notches of the shape of the trough cut therein. This serves to stiffen and support the troughs or fingers. The side troughs 28, 29 are of only half section, as best shown in Figs. 1 and 3, and they may be connected to the side walls 12, 13 by means of a vertical web 30, suitably secured to the side walls. This construction prevents the catching of twigs between the troughs and the side walls.

The picker is operated by suitable handles 21 secured to the outer ends of diagonally projecting arms 22, 23 by means of transverse bolts 24, which pass through the arms and the handles and are held in place by nuts 25. Additional apertures 26, 27 are provided in the arms to permit of adjustment of the handles to a desired height in order to accommodate the reach and height of different users. The arms may be secured to the sides of the box in any suitable manner, as by spot-welding or riveting.

A device constructed as described will be found to be efficient in operation, light in weight and may be economically constructed.

I claim:

1. A berry picker comprising in combination, a box having five closed sides and one open side, pointed troughs connected to the bottom wall at the open side and projected forwardly substantially in parallelism with the bottom wall, the rear side wall being hinged to permit of the discharge of picked berries therethrough, substantially as described.

2. In a berry picker, the combination of a container having a hinged rear wall and an open side, and a plurality of picker-fingers projecting forwardly from the open side, the bottom wall to which the rear wall is hinged being located in a plane beneath the bottoms of the picker-troughs, substantially as described.

3. In a berry picker, the combination of a box having an open side, fingers in the form of troughs projecting from said open side, side arms secured to the box, and handles adjustably mounted on said side arms, substantially as described.

Signed at Chicago, Ill., this 27th day of February, 1920.

ANTHONY MAHTES.

Witness:
T. D. BUTLER.